Jan. 24, 1928.

E. BUKER 1,656,941

CAR SEAT

Filed April 11, 1927

Inventor
Edward Buker
By Barnett & Truman
Attorneys

Jan. 24, 1928.
E. BUKER
1,656,941
CAR SEAT
Filed April 11, 1927   2 Sheets-Sheet 2
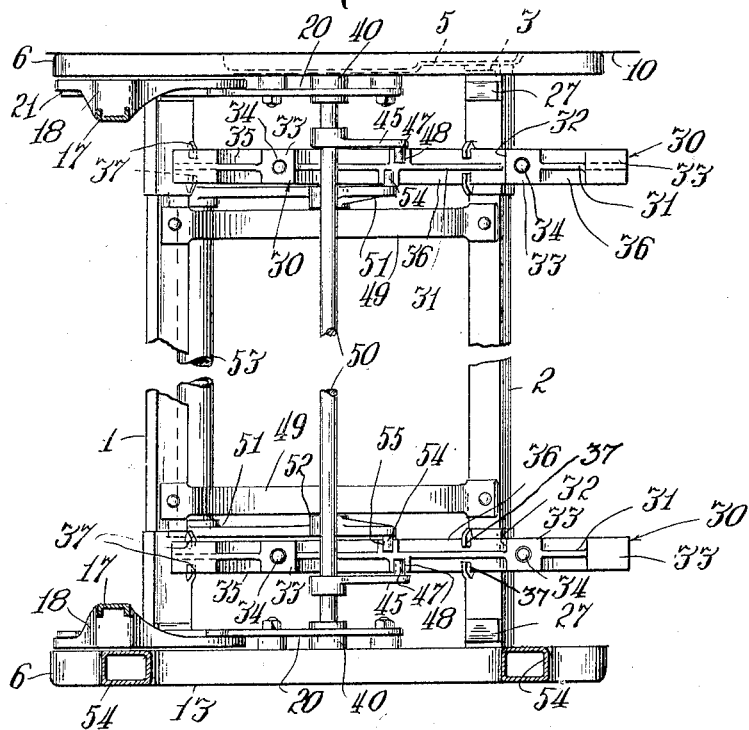
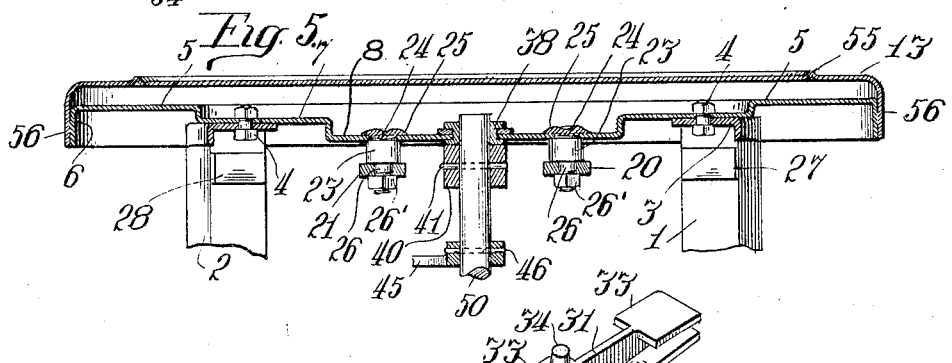
Inventor
Edward Buker
By Barnett & Truman
Attorneys Patented Jan. 24, 1928.

1,656,941

UNITED STATES PATENT OFFICE.

EDWARD BUKER, OF CHICAGO, ILLINOIS, ASSIGNOR TO COACH AND CAR EQUIPMENT CORPORATION, OF CHICAGO, ILLINOIS, A CORPORATION OF ILLINOIS.

CAR SEAT.

Application filed April 11, 1927. Serial No. 182,750.

This invention relates to an improved car seat, and more particularly to a car seat which can be reversed so that the occupant may face in either of two directions, the seat comprising a back, a seat-cushion, and a foot-rest, and means for supporting the different parts whereby they will move in unison from one position to the other.

More specifically, the car seat comprises a fixed frame and a seat-cushion carried by rockers slidable laterally across the frame whereby the lateral position and inclination of the cushion may be changed. The back is supported on the frame by means of a pair of parallel links, and a lever or levers positioned intermediate the links and connected with the back and with one of the cushion-supporting rockers serve to shift the cushion in unison with the back, but in an opposite direction. The foot-rest is supported upon levers pivoted in the frame, one or more of the levers being connected with the cushion-supporting rockers so that the foot rest will also be swung from one position to another in unison with the movements of the back and seat cushion.

The main object of the invention is to provide an improved car seat of the type briefly described hereinabove and described in more detail in the description which follows.

Other objects and advantages of the invention will be more apparent from the following detailed description of one approved form of car seat involving the principles of this invention.

In the accompanying drawings:

Fig. 4 is a plan view of the supporting and operating mechanism, the back and seat cushion being removed.

Fig. 5 is a partial horizontal section taken substantially on a line corresponding to the line 5—5 of Fig. 3, but through the opposite or aisle end of the car seat, instead of the car-wall end shown in Figs. 2 and 3.

Fig. 6 is a perspective view of one of the rockers.

Figure 1:
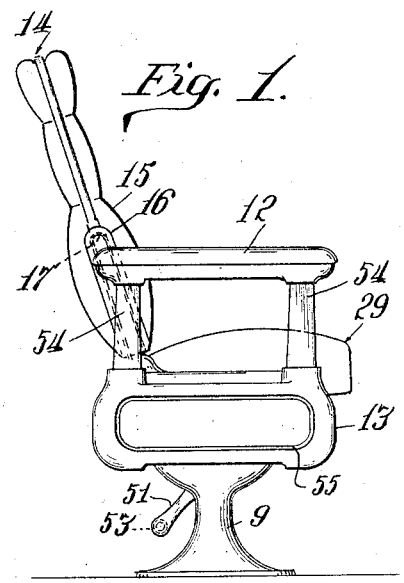
Fig. 1 is an end elevation of the complete car seat.
Figure 2:
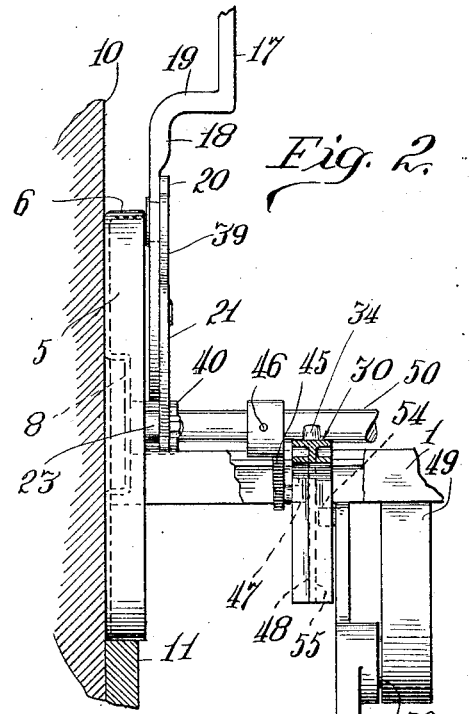
Fig. 2 is an enlarged rear elevation of a portion of one end of the supporting and operating mechanism, the back and seat cushion being removed.

The supporting frame comprises a pair of spaced, parallel, horizontally extending sills 1 and 2, preferably formed of angle-iron sections, these sills being attached at their ends to angle plates 3 which in turn are bolted or riveted, as at 4, to the similar pressed metal end plates 5. The end plates 5 are provided with edge reinforcing flanges 6, and the intermediate portions of the plates are pressed inwardly, as at 7 and 8, to provide clearance for the heads of the bolts, rivets and shaft bearings mounted in the end plates. The end portions of the sills 1 and 2 may be supported on suitable pedestals 9, or as in the example here shown, one end of the frame may be supported on a pedestal 9 and the other end supported by attaching the end plate 5 in any suitable manner to the wall 10 of the car. This end plate 5 may rest upon a plate or ledge 11 formed on the car wall. Suitable arm rests 12 and end coverplates 13 may be attached to and supported by either or both of the end plates 5, in a manner hereinafter described.

The back 14 comprises cushions 15 mounted on a suitable supporting frame, the cushions being duplicated at both sides of the back so that it is reversible. Most of the back frame is concealed by the upholstery, but outer pocket members 16 are provided along the lower part of each end edge of the back, these pockets 16 being adapted to removably receive the upwardly projecting ends 17 of the back arms 18. The arms 17 are secured by screws or in any other suitable manner within the pocket members 16. The back arms comprise the lower, substantially triangular plates 18, to the upper ends of which the upwardly extending arms 17 are joined by the inwardly extending arms 19. Two similar supporting links 20 and 21, arranged substantially parallel with one another, are pivoted or hinged at their upper ends 22 to the plate 18, and are hinged at their lower ends to the inwardly pressed portion 8 of the end plate 5. Bolts or rivets 23 have their reduced ends 24 passed through the end plate 5 and then riveted down and spot-welded to the plate 5, as indicated at 25. The lower ends of the links 20 and 21 are pivoted on the reduced inner ends 26 of rivets 23, and are held thereon by the nuts 26'. Similar means may be used for pivoting the upper ends of the limbs 20 and 21 to the plate 18. This form of pivotal connection is merely illustrative, and other means might be used for pivoting the links 20 and 21 to the end plate 5 and back-arm plate 18. When the back 14 is swung to one position, for example to the left, as shown in the drawings, the link 21 will engage and rest upon a ledge or seat 27 formed on the sill 2 and thus limit the swinging movement of the back and support this end of the back. The same mechanism is duplicated at the other end of the back and frame. When the back is swung over to the right to its opposite position it will be supported by the engagement of link 20 with a seat 28 formed on sill 1.

Figure 3:
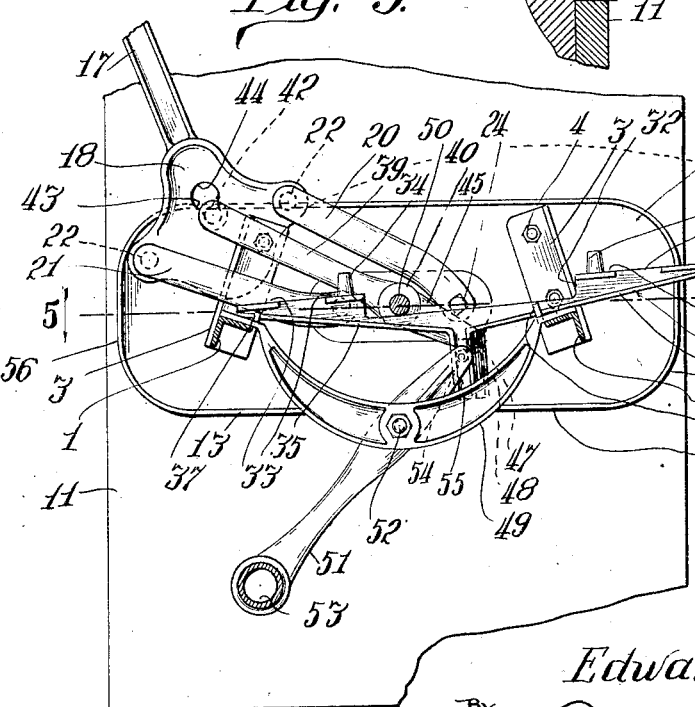
Fig. 3 is a transverse vertical section, showing the parts illustrated in Fig. 2, this view being taken substantially as if looking from the right at Fig. 2.

The seat cushion 29 is supported upon a pair of similar rockers 30. These rockers are substantially identical in construction, one of them being illustrated in perspective in Fig. 6. Each rocker comprises a vertical web 31, which is cut away centrally at 32 to clear the rock shaft 50, hereinafter described, the web 31 supporting a plurality of plates 33, all positioned in the same substantially horizontal plane for supporting the cushion 29. Studs 34 projecting upwardly from certain of the supporting plates 33 may engage suitable sockets in the frame of cushion 29 to anchor the cushion in place. The lower portion of the rocker comprises sidewardly extending ribs or flanges 35 and 36 which incline downwardly from the ends of the rocker toward the center thereof. The flanges 35 are adapted to slide upon and be supported by the sill 1, and the flanges 36 are correspondingly supported by the sill 2. The sills are formed with seats or slideways for the rockers, the seats comprising fingers 37 which project over the flanges 35 and 36 to hold the rockers slidably in place upon the sills. It will be apparent that when the rockers are slid transversely across the sills 1 and 2 to one limit of their movement, as illustrated in Figs. 3 and 4, the cushion 29 will be projected somewhat toward the right, as seen in Fig. 1, and will be inclined downwardly toward the left or toward the seat-back 14, this being the desirable position of the cushion, both for the comfort of the occupant and for the economy of space within the car.

When the back is swung to its other position, that is toward the right in Fig. 1, it is desirable that the cushion 29 be projected toward the left and inclined downwardly toward the right. Mechanism is provided for accomplishing the simultaneous shifting of the back and cushion between their different respective positions. The rock-shaft 50, previously referred to, is pivotally supported at its ends, preferably by means of bearings 38 pressed in place within the end plates 5, as shown in Fig. 5. Levers 39 have hubs 40 at their lower ends secured on the respective ends of rock shaft 50 adjacent the end plates 5. Pins 41 may be passed through the hubs 40 and shaft 50 to fix the levers non-rotatably to the rock-shaft. Each lever 39 carries at its upper end a pin or stud 42 which engages rotatably within an opening 43 in the plate 18 of the back-arm. Preferably the opening 43 is elongated and provided with a larger upper end 44 as indicated in Fig. 3 to permit the ready detachment of lever 39 from plate 18. It will be noted that the lever arm 39 is positioned midway between the links 20 and 21 and moves parallel therewith at all times. Levers 45 secured at their upper ends to rock-shaft 50, for example by pins 46 passed through the levers and shaft, are provided at their lower ends with inwardly projecting studs 47 which engage slidably within vertical cam slots 48 formed at one side of the central portion of rockers 30. It will be evident that as the back 14 is swung from one position to another, the levers 39 will share the swinging movement of the links 20 and 21, and the lower levers 45 will swing in the opposite direction from the movement of levers 39 and the back 14. Due to the engagement of pins 47 on levers 45 with the cam slots 48 on the rockers 30, the rockers will be forced to slide from one limit of their movement to the other as the levers 39 and 45 are swung over in unison with the movement of back 14. Therefore, as the back is swung in one direction the seat will be shifted in the opposite direction so that its position and inclination will always properly conform to that of the back 14. The levers 39 and 45 correspond to the upper and lower arms of a single lever intermediately secured to or pivoted on the rock-shaft 50 and in some instances a single lever might be used if the spacing of the several elements of the device will so permit.

A pair of downwardly bowed bridge members 49 connects the sills 1 and 2 at spaced intervals longitudinally of the frame. A lever 51 is intermediately pivoted at 52 to the central part of each bridge 49, and a foot rest 53 is supported by the lower ends of levers 51. The upper ends of levers 51 carry outwardly projecting pins or studs 54 which engage within vertical cam slots 55 centrally formed on the rockers 30 at the sides thereof opposite from the cam slots 48. It will be evident that as the cushion 29 and rockers 30 are moved from one position to another, the levers 51 will be swung about their pivots 52 so that the foot rest 53 will always be positioned properly beneath the back 14.

With the various parts once assembled, as shown and described, the proper shifting movements of the cushion 29 and foot rest 53 will always be accomplished automatically whenever the seat back 14 is shifted from one of its positions to the other.

The arm rest 12 is supported by uprights 54 from the cover-plate 13. Plate 13 may be provided with any desired surface ornamentation, such as beading 55, and has a peripheral flange 56 adapted to fit about the edge flange 6 of the end-plate 5. The bolts or rivets 4 and 23, and the bearing 38 may first be secured in place in the plate 5, and then the cover plate 13 may be fitted over the plate 5, and the flanges 6 and 56 permanently united by spot-welding or in any other suitable manner. In this manner, the end portion of the frame may conveniently be first assembled as a unit before the remainder of the frame and operating mechanism is assembled therewith.

I claim:

In a car seat, in combination with a back, a seat cushion, and a foot-rest, a frame comprising a pair of parallel, spaced, horizontal sills, end plates connecting the ends of the sills, means for supporting the frame above the car floor, a back-arm attached to each end of the back, a pair of parallel links pivoted at their upper ends to each back-arm and at their lower ends to the adjacent end plate, a rock-shaft pivoted at its respective ends in the end plates midway between the pivotal connections for the respective pair of links, a pair of rockers supporting the seat-cushion and resting slidably at their ends upon the sills, guides on the sills for the rockers, each rocker having a pair of oppositely facing vertical cam slots at its central portion, a pair of levers near the ends of the rock-shaft the upper arms of the levers being pivoted to the back arms intermediate the pivotal connections of the links, a second pair of levers each secured at one end to the rock-shaft and having a lateral projection engaging in one of the cam slots of the adjacent rocker, a pair of bridge members connecting the sills, a lever intermediately pivoted to each bridge member, the lower arms of the latter levers supporting the foot-rest, and the upper arms having lateral projections engaging in the remaining cam slots of the rockers.

EDWARD BUKER.